Jan. 16, 1945.  R. L. DUCKLO  2,367,490
DIE
Filed Aug. 9, 1943  3 Sheets-Sheet 1

INVENTOR.
ROBERT L. DUCKLO
BY Chas. E. Riordan
ATTORNEY

Jan. 16, 1945.    R. L. DUCKLO    2,367,490
DIE
Filed Aug. 9, 1943    3 Sheets-Sheet 2

INVENTOR.
ROBERT L. DUCKLO
BY Chas. E. Rinder
ATTORNEY

Jan. 16, 1945.  R. L. DUCKLO  2,367,490
DIE
Filed Aug. 9, 1943   3 Sheets-Sheet 3

INVENTOR.
ROBERT L. DUCKLO
BY
ATTORNEY

Patented Jan. 16, 1945

2,367,490

UNITED STATES PATENT OFFICE 2,367,490

DIE

Robert L. Ducklo, Cincinnati, Ohio, assignor, by mesne assignments, to Benjamin W. Freeman, Cincinnati, Ohio Application August 9, 1943, Serial No. 497,984

14 Claims. (Cl. 154—1)

This invention relates to dies, one of the valuable uses being their application to shoe manufacture by cutting out pieces of material and applying them with the aid of an adhesive to another part or parts.

A primary object of the present invention is the provision of a die for cutting a plurality of pieces of material from one piece of material, and in the cycle of operation, placing these cut pieces of material in a definite prearranged pattern onto another piece or pieces of material which has been treated with an adhesive so that the cut pieces remain relatively firmly attached, so that on subsequent operations of the material they remain in their predetermined pattern.

A specific use for this die may be the making of shoe ornaments, such as the tongue, by cutting several pieces of cork to a predetermined shape and size and applying adhesive to a cut piece of buckram or other backing material, applying the cut pieces of cork to the adhesive side of the backing material so that they form a predetermined pattern. A molded leather piece may then be applied over the cork to provide a finished ornament. Without the use of this die, the operations would be costly and slow and would retard shoe production. The applying of the cork pieces to the backing material in a definite pattern would be a difficult and tedious operation and would not produce uniform results. Without the use of this die, in order to place the cork pieces in their relative positions, it would be necessary to mark each piece of backing material with the outline of the cork pieces and it would be up to the operator to place these cork pieces within the margins of the marked lines.

To the attainment of the foregoing and other objects that will appear as the description proceeds, reference may be made to the accompanying drawings in which like reference numerals designate like parts:

Figure 1:
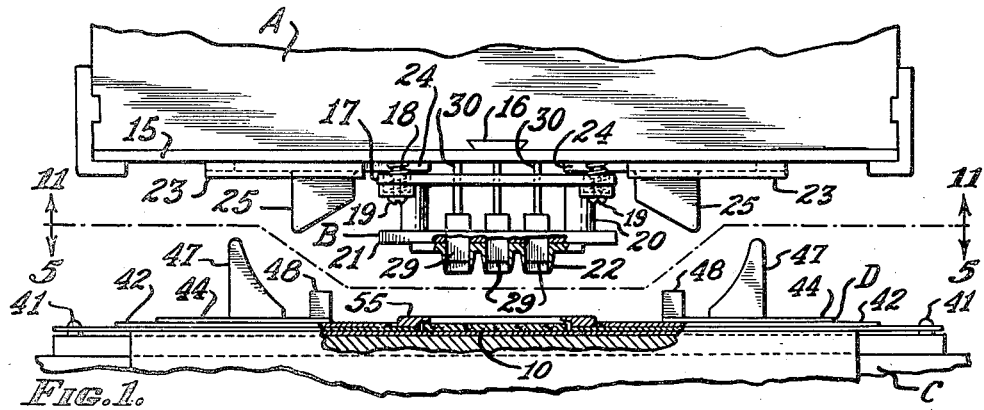
Figure 1 is a fragmentary front elevation, with parts broken away and other parts in section, showing my improved device as used in a cut-out machine, the ram and platen of the machine being shown in open relation and a work piece (cork), being shown in position ready for the first operation of cutting the cork.
Figure 2:
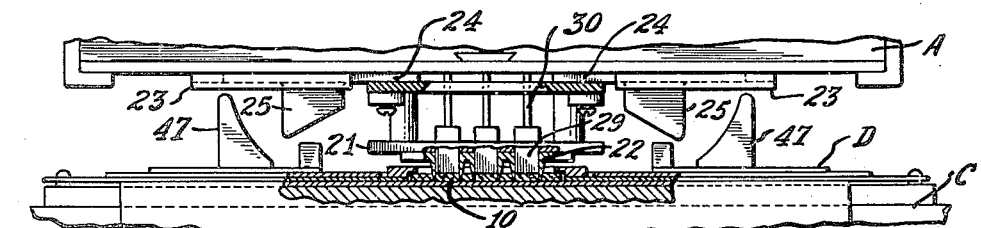
Figure 2 is a view similar to Figure 1, but showing the position of the parts at the completion of the cutting stroke.

The die carriage A carries the die unit B in operative relation to the work support C which in turn carries the gauge plate and adjusting mechanism D in the illustrated embodiment. The work support C is a vertically movable plunger arranged to press the work upwardly against the die, thus effecting the ornament operation on the work. The die carriage A is laterally movable, i. e. from a forward operating position over the work supporting plunger, to a rearward inoperative position where the die will be out of the way when an operator is adjusting or replacing the work.

The die unit B in the form illustrated comprises a base plate 15, by means of which the unit is secured to the die carriage A. A dovetailed wedge 16, and an upstanding perforated lug or ear (not shown) may be utilized on the plate 15 to cooperate with suitable locking means (not shown) on the die carriage A and thereby be accurately positioned and secured in the machine. Resiliently mounted and spaced from plate 15 is an additional plate or floating plate 17. This floating plate 17 being spaced from the base plate 15 by means of springs 18, which are in turn carried by studs or screws 19. Struts or supporting posts 20, carry sub-plate 21 which in turn carries the cutting plate 22. Guides 23 are rigidly mounted by suitable means on base plate 15 and act as guides for cam supporting plates 24. Rigidly mounted on cam plates 24 are cams 25. Properly located in cam plates 24 are slots 26 which govern the amount of movement toward and away from one another of the cam plates 24 and the cams 25. Screws or studs 27 act as stop pins or limit posts for the slots 26. Attached to floating plate 17 and to cam plates 24 are springs 28 which pull the cam plates 24 and the cams 25 into their closest proximity between the base plate 15 and the floating plate 17, when the floating plate 17 is in the position farthest away from the base plate 15. When cutting the cork or other material the cam plates 24 are in the positions closest to one another and act as a support between the floating plate 17 and the base plate 15 so that the cutting plate 22 does not yield when the pressure of the machine is exerted against it. The cut pieces of cork naturally are retained within the walls of the cutting plate 22 and the scrap or waste material remains on the gauge plate D. In order to remove the cork pieces from within the cutting plate or place them on the adhesive on the buckram or backing material the following mechanism is used:

A series of plungers 29, conforming in shape to the cutting plate 22 and enough smaller in size to provide clearance and slidability are mounted on plunger pins 30 which are in turn rigidly mounted to the base plate 15. Clearance holes are provided in the floating plate 17 for the free passage of the plunger pins 30. The gauge plate D is provided with the mechanism which actuates the cams on the die unit B. The gauge plate D is provided with openings 40 which fit on pins 41 on the plunger or work support C. This accurately locates the gauge plate D with relation to the die unit B. To the gauge plate D is slidably mounted an intermediate plate 42 suitably provided with guiding slots 43. Gauge cam plates 44 are slidably mounted on the intermediate plate 42. Cam guide slots 45 are provided in the gauge cam plates 44 for accurately guiding the gauge cam plates 44. The pins which engage the several slots, noted generally at 46, guide the movements both of the intermediate plate 42 and the gauge cam plates 44. Cams 47 are rigidly mounted to the gauge cam plate 44 and may or may not contact the cams 25 of the die until B depending upon the position of the cams. Lifting bars 48 are rigidly mounted on gauge cam plates 44 and act to raise the cutting plate 22 out of cutting position when the die unit B is adjusted. For controlling the position of the plates and hence the cams 47, an adjusting lever 49 is pivotally mounted to the gauge plate D by means of screw or pivot pin 50. Adjusting lever 49 is provided with a bar or knob 51 for conveniently moving the lever to its different positions. The adjusting lever may be pointed as at 52 to help accurately locate the lever in its proper position relative to a scribed line. Yieldably mounted between the gauge plate D and the adjusting lever 49 is a small ball which falls into holes 53 provided in the gauge plate aiding in the quick location of the adjusting lever. A connecting link 54 is pivotally attached both to the intermediate plate 42 and the lever 49. By moving the lever, the plate is shifted and due to the cam slots 45 on the cam plates 44, the latter are displaced laterally. A gauge plate 55 may be fixedly mounted on the gauge plate D. The gauge plate 55 may be partially recessed along the gauging area so that if the work is curled, it may be placed under the recess of the gauge.

From the foregoing the operation and advantages of the improved die unit including its gauge plate will be readily understood.

Figure 5:
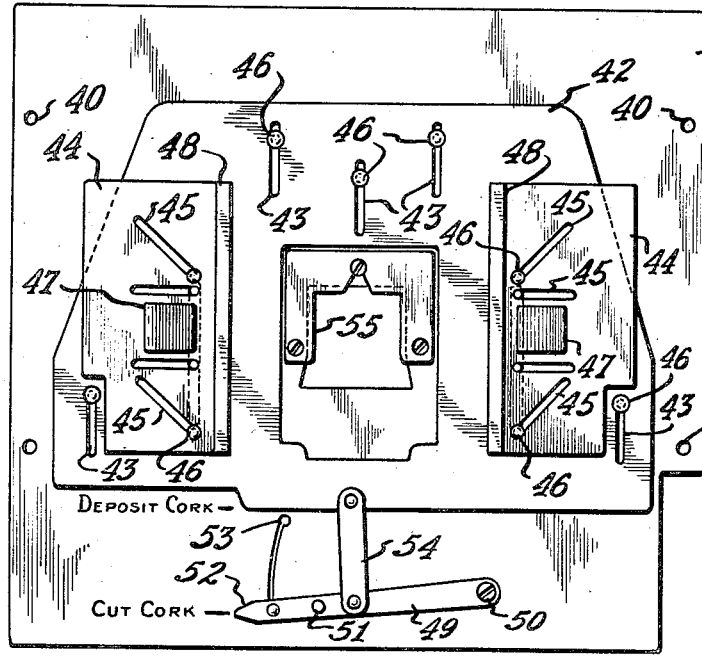
Figure 5 is a view taken on the line 5—5 of Figure 1 and shows the lower member in position for cutting the cork.
Figure 6:
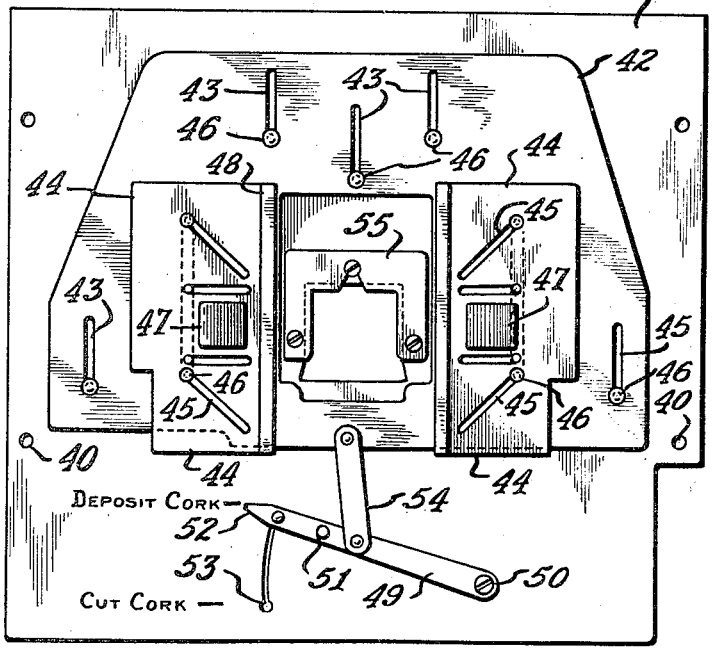
Figure 6 is a similar view showing the member in its alternate position.
Figure 7:
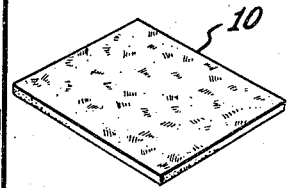
Figure 7 shows a piece of cork.

To complete the die work on the die a piece of cork 10 which has been cut to size as shown in Figure 7 is placed in the gauge 55 and the adjusting lever 49 is moved to the position on the gauge plate D which is stenciled "cut cork" as shown in Figure 5. This moves the cams 47 to their outermost position as shown in Figure 1. The springs 28 of die unit B pull the cam plates 24 into their closest possible positions between the floating plate 17 and the base plate 15 so that the cutting plate 22 and the subplate 21 are no longer yieldably mounted, but bottom against the cam plates 24.

Figure 3:
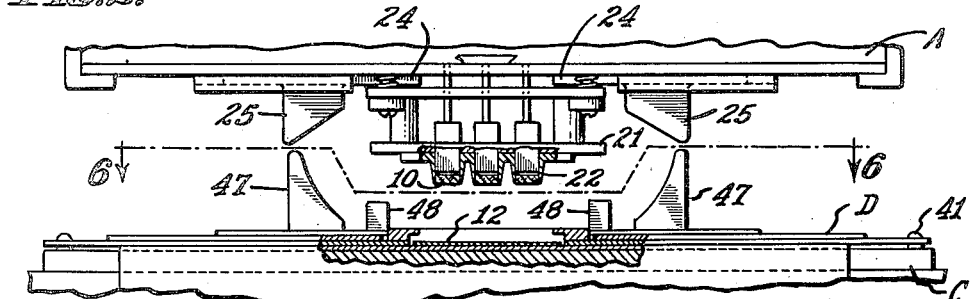
Figure 3 shows the position occupied by the various parts when the ram is retracted, the cut-out portions of the cork being retained in the tubes of the die and the waste material (cork) being removed from the holder to now be supplanted by a piece of cloth or backing material. Also, certain cams have been moved in preparation for the next operation.
Figure 4:
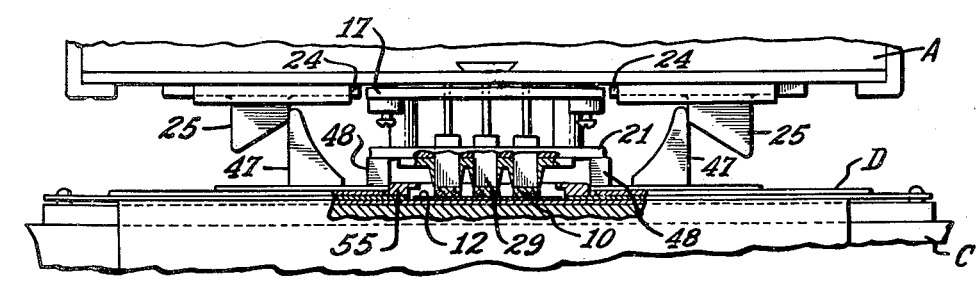
Figure 4 illustrates the final operation of placing the cork cut-outs onto the cloth.
Figure 8:
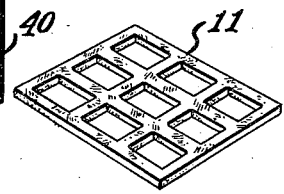
Figure 8 shows a waste piece which will be discarded.
Figure 10:
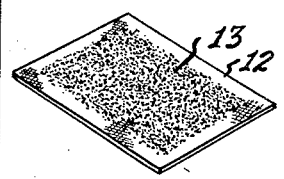
Figure 10 shows the backing material before application of the cork pieces, adhesive being indicated for retaining the pieces.
Figure 12:
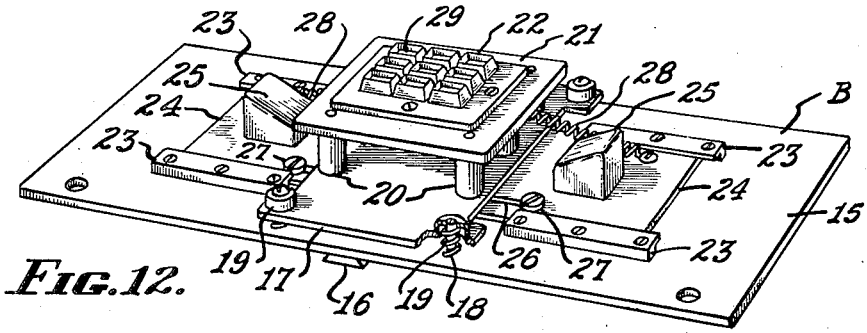
Figure 12 is a perspective of the upper member.
Figure 11:
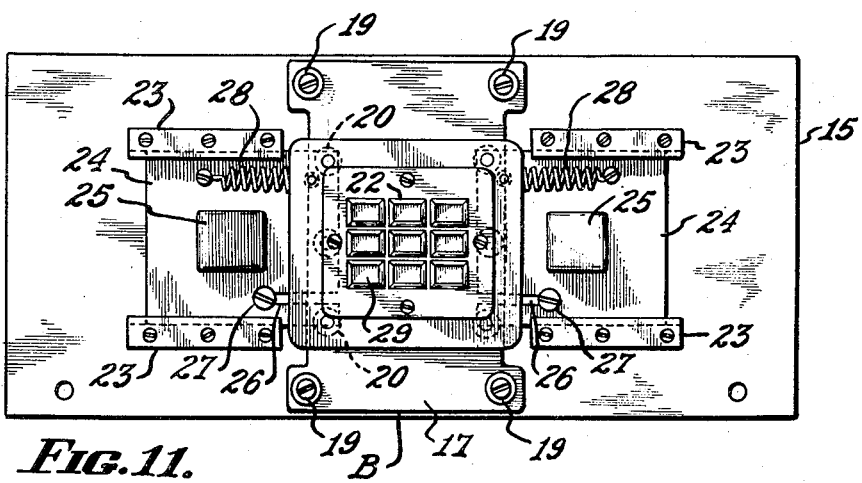
Figure 11 is a view taken on the line 11—11 of Figure 1, showing the upper member.

When the machine is treadled, the die carriage A supporting the die unit B moves to the forward or working position, at which time the plunger or work support C presses the work, in this instance cork, against the die cutting it into shapes determined by the shapes of the cutting plate 22. The plunger C returns to its rest position and the die carriage A together with die unit B moves to its rearward or rest position. The unused portion of the cork as illustrated at 11 in Figure 8 is removed from the gauge 55 and discarded. The adjusting lever 49 is then moved to the position "deposit cork," which brings the cams 47 into their closest possible position as shown in Figure 3. A piece of buckram or backing material 12, one side of which has been covered with adhesive 13 as shown in Figure 10 is placed in the same gauge 55. The machine is treadled, the die carriage A with the die unit B moves forward to its working position. The plunger or work support C raises toward its cutting or topmost position, and while this is going on, the cams 47 of the gauge plate engage the cams 25 of die unit B and move the cams 25 together with the cam plates 24 to their outermost position, leaving the plate 17 free to move up, against its spring mounting. Also the lifting bars 48 engage the bottom of the sub plate 21, thus raising the die structure including cutting plate 22 out of cutting position. The plungers 29 being rigidly mounted to the base plate 15 will then advance through the openings in the receding cutting plate 22 and act to eject the cut pieces of cork which have remained within the walls of the cutting plate 22. The height of these plungers 29 are of a height sufficient to exert some pressure against the cork as it is deposited against the adhesive on the buckram backing material.

Figure 9:
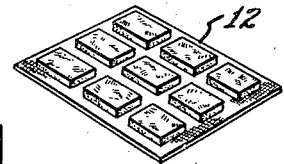
Figure 9 shows the cut-out corks in place on the backing material.

The completion of the cycle comprises the lowering of the work support or plunger C away from the die unit B into its rest position and the moving of the die carriage A together with the die unit B rearwardly to its rest position, leaving the cut pieces of cork adhered in their positions to the adhesive backing material, as illustrated in Figure 9.

Instead of using a cemented piece of buckram or whatever backing material is to be employed to receive the cork, the position of the plungers may be so arranged that the cork pieces that remain in the die plate project slightly therefrom after the cutting step. Since the support D with the die moves to and fro, this motion can be employed to deposit adhesive on the cork, by means of a glue roll suitably mounted so as to be contacted by the projecting cork pieces.

As a suitable construction of a machine serving to operate the movable parts above described, I refer to Letters Patent No. 2,084,335 to B. W. Freeman, dated June 22, 1937.

An assembly such as has now been shown to illustrate my invention might be inverted so as to operate in the opposite direction, and the stationary parts made movable and the movable parts stationary, such changes in detailed structure being equivalents of the exemplary structure shown. The particular modes of cam, and the modes of mounting the cam plates to move them is optional as are the several details of structure which are not called for specifically in the claims that follow in which I set forth the novelty in my invention, which novelty is shown in the one particular example shown thereof.

Having thus described my invention, what I claim as new and desire to secure by Letters Patent is:

1. In combination, a die and a work support, same being relatively movable, means for mounting said die so that it is subject to resiliently resisted movement, means for inhibiting the movement, movable means for controlling the movement inhibiting means, said die having knock-outs for pieces of work lodged therein following a cutting operation, which knock-outs are relatively rigidly supported so that upon movement of the die relative thereto, the knock-outs will dislodge the pieces of work, and serve as abutments to force the said pieces against another work piece substituted on the work support, and means for moving the die to effect this operation.

2. In combination, a die and a work support, same being relatively movable, means for mounting said die so that it is subject to resiliently resisted movement, means for inhibiting the movement, movable means for controlling the movement inhibiting means, said die having knock-outs for pieces of work lodged therein following a cutting operation, which knock-outs are relatively rigidly supported so that upon movement of the die relative thereto, the knock-outs will dislodge the pieces of work, and serve as abutments to force the said pieces against another work piece substituted on the work support, and means for moving the die to effect this operation, the movement inhibiting means being resiliently held in movement inhibiting position, and the means for controlling the same arranged to remove it therefrom.

3. In combination, a die and a work support, same being relatively movable, means for mounting said die so that it is subject to resiliently resisted movement, means for inhibiting the movement, movable means for controlling the movement inhibiting means, said die having knock-outs for pieces of work lodged therein following a cutting operation, which knock-outs are relatively rigidly supported so that upon movement of the die relative thereto, the knock-outs will dislodge the pieces of work, and serve as abutments to force the said pieces against another work piece substituted on the work support, and means for moving the die to effect this operation, the movement inhibiting means being resiliently held in movement inhibiting position, and the means for controlling the same arranged to remove it therefrom, there being cam faced elements on the movement inhibiting means and the movement controlling means.

4. In combination, a die and a work support, same being relatively movable, means for mounting said die so that it is subject to resiliently resisted movement, means for inhibiting the movement, movable means for controlling the movement inhibiting means, said die having knock-outs for pieces of work lodged therein following a cutting operation, which knocks-outs are relatively rigidly supported so that upon movement of the die relative thereto, the knock-outs will dislodge the pieces of work, and serve as abutments to force the said pieces against another work piece substituted on the work support, and means for moving the die to effect this operation, the movement inhibiting means being resiliently held in movement inhibiting position, and the means for controlling the same arranged to remove it therefrom, there being cam faced elements on the movement inhibiting means and the movement controlling means, the cam faced elements on the movement controlling means being settable by an operator so as either to miss or to contact the cams on the movement inhibiting means.

5. The combination of claim 1 in which the movement controlling means is mounted on the work support.

6. The combination of claim 2 in which the movement controlling means is mounted on the work support.

7. The combination of claim 3 in which the movement controlling means is mounted on the work support.

8. The combination of claim 4 in which the movement controlling means is mounted on the work support.

9. In combination, a die and a work support, same being relatively movable, means for mounting said die so that it is subject to resiliently resisted movement, means for inhibiting the movement, movable means for controlling the movement inhibiting means, said die having knock-outs for pieces of work lodged therein following a cutting operation, which knock-outs are relatively rigidly supported so that upon movement of the die relative thereto, the knock-outs will dislodge the pieces of work, and serve as abutments to force the said pieces against another work piece substituted on the work support, and means for moving the die to effect this operation, the movement inhibiting means being resiliently held in movement inhibiting position, and the means for controlling the same arranged to remove it therefrom, there being cam faced elements on the movement inhibiting means and the movement controlling means, the cam faced elements on the movement controlling means being settable by an operator so as either to miss or to contact the cams on the movement inhibiting means, and die engaging means movable with the cam means on the controlling means to provide the die moving means aforesaid, thereby effecting the relative movement of die knock-outs.

10. The combination of claim 9, in which the movement controlling means is mounted on the work support.

11. In combination, a cutting die having holes therein in which the cut-out portions from a work piece will become lodged, knock-outs movable in said holes to dislodge said cut-outs, means for causing relative movement of the die and the knock-outs at will, means for supporting alternate pieces of work at the same operating station, one piece of work to provide the cut-out portions and another piece to have same deposited thereon by the knock-outs, said supporting means relatively movable with reference to the die, and elements subject to setting by an operator to inhibit movement of the knock-outs with reference to the die when cutting out the first of said two pieces of work, and alternatively to provide for movement of the knock-outs relative to the die incident to an operation of the said combination on the second of the two pieces of work, said knock-outs arranged to act as abutments to force the dislodged pieces against the second piece of work during this latter movement.

12. In combination, a cutting die having holes therein in which the cut-out portions from a work piece will become lodged, knock-outs movable in said holes to dislodge said cut-outs, means for causing relative movement of the die and the knock-outs at will, means for supporting alternate pieces of work, one to provide the cut-out portions and another to have same deposited thereon by the knock-outs, said supporting means relatively movable with reference to the die, and elements subject to setting by an operator to inhibit movement of the knock-outs with reference to the die when cutting out the first of said two pieces of work, and alternatively to provide such relative movement, said knock-outs arranged to act as abutments to force the dislodged pieces against the second piece of work during this latter movement, the relative movement of die and knock-outs being provided by having the die supported so as to move with respect to the knock-outs, and the work support having means thereon to control whether the die shall move or not move.

13. In combination, a cutting die having holes therein in which the cut-out portions from a work piece will become lodged, knock-outs movable in said holes to dislodge said cut-outs, means for causing relative movement of the die and the knock outs at will, means for supporting alternate pieces of work, one to provide the cut-out portions and another to have same deposited thereon by the knock-outs, said supporting means relatively movable with reference to the die, and elements subject to setting by an operator to inhibit movement of the knock-outs with reference to the die when cutting out the first of said two pieces of work, and alternatively to provide such relative movement, said knock-outs arranged to act as abutments to force the dislodged pieces against the second piece of work during this latter movement, the relative movement of die and knock-outs being provided by having the die supported so as to move with respect to the knock-outs, and the work support having means thereon to control whether the die shall move or not move, the die having means to restrain it from moving, and the work support having conjointly operating means to release the die for movement and cause it to move, so that the cutting edges thereof will not engage the second piece of work incident to the depositing operation.

14. A method of cutting out pieces of material and applying them to the surface of other pieces of material, which consists in a cyclic operation on a single vertical axis, first cutting the pieces which are to be applied from one work piece so as to lodge them in the cutting device, then substituting a second work piece in place of the first work piece, and pushing the lodged pieces out of the die and against the surface of the substituted work piece, while at the same time pushing the cutting portion of the die out of contact with the second work piece.

ROBERT L. DUCKLO.